United States Patent
Morgan, III

(10) Patent No.: US 7,529,930 B2
(45) Date of Patent: *May 5, 2009

(54) EXTENSIBLE AND FLEXIBLE ELECTRONIC INFORMATION TRACKING SYSTEMS AND METHODS

(75) Inventor: George J. Morgan, III, Wooster, OH (US)

(73) Assignee: Resource Consortium Limited, Tortola (BV)

( * ) Notice: Subject to any disclaimer, the term of this patent is extended or adjusted under 35 U.S.C. 154(b) by 282 days.

This patent is subject to a terminal disclaimer.

(21) Appl. No.: 11/486,909

(22) Filed: Jul. 14, 2006

(65) Prior Publication Data

US 2007/0022298 A1    Jan. 25, 2007

Related U.S. Application Data

(63) Continuation of application No. 10/156,739, filed on May 28, 2002, now Pat. No. 7,085,932.

(60) Provisional application No. 60/293,659, filed on May 25, 2001.

(51) Int. Cl.
*G06F 9/00* (2006.01)

(52) U.S. Cl. .................. 713/161; 713/164; 713/165; 713/167; 713/168

(58) Field of Classification Search .................. 713/161, 713/164, 165, 167, 168
See application file for complete search history.

(56) References Cited

U.S. PATENT DOCUMENTS

| 5,384,835 | A | | 1/1995 | Wheeler et al. |
| 5,400,403 | A | * | 3/1995 | Fahn et al. .................... 705/51 |
| 5,524,051 | A | * | 6/1996 | Ryan ........................... 380/237 |
| 5,586,186 | A | * | 12/1996 | Yuval et al. .................... 380/30 |
| 5,613,012 | A | | 3/1997 | Hoffman et al. |
| 5,661,799 | A | * | 8/1997 | Nagel et al. .................... 705/52 |
| 5,671,279 | A | | 9/1997 | Elgamal |
| 5,742,762 | A | | 4/1998 | Scholl et al. |
| 5,764,955 | A | | 6/1998 | Doolan |
| 6,163,772 | A | | 12/2000 | Kramer et al. |

* cited by examiner

*Primary Examiner*—Thomas R Peeso
(74) *Attorney, Agent, or Firm*—Carlineo, Spicer & Kee, LLC

(57) ABSTRACT

A method and system for tracking electronic information includes the steps of: encrypting an electronic file stored on a hardware storage device; attaching or incorporating with the file a standalone executable program that implements a request for a decryption key accompanied by tracking information when an attempt is made to access the file; verifying the tracking information by a central processing unit; if the tracking information is verified as acceptable, providing the decryption key; and if the tracking information is not verified as acceptable, modifying the file to include a record of the failed attempt to access the file and the tracking information, and storing said modified file on the hardware storage device.

10 Claims, No Drawings

EXTENSIBLE AND FLEXIBLE ELECTRONIC INFORMATION TRACKING SYSTEMS AND METHODS

CROSS-REFERENCE TO RELATED APPLICATIONS

The present application is a continuation patent application and claims the priority of U.S. Patent application Ser. No. 10/156,739, filed on May 28, 2002, now U.S. Pat. No. 7,085,932 the entire content of which is incorporated herein by reference, which claims the priority of U.S. Provisional Patent Application Ser. No. 60/293,659, filed May 25, 2001, the entire content of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure after the patent has been duly issued or the application published, as it appears in the PTO patent files or records, but otherwise reserves all copyright rights whatsoever.

DESCRIPTION OF THE INVENTION

The present invention provides electronic information tracking systems and methods that track electronic files upon (or subsequent to) execution/opening of the files in a manner in which information concerning access to the file as well as the geographic position of the file may be obtained and logged.

In one embodiment, the invention comprises two primary components: (1) a hardware component and (2) a software component. The hardware component includes a geographic locator device (such as a GPS tracking device, for example) that allows a remote source (such as a GPS satellite, for example) to precisely track the geographic location at which the hardware component is installed. The software component may be embedded into or act as a container for an electronic file or other electronic information; or the software may be embedded into or wrapped around software and/or files or other electronic representations of data residing on the computer.

The software component may be tracked by a central server when the computer in which the software resides connects to the Internet (or another suitable network, for example) and the file has been accessed by the computer. When accessed, the software causes the computer to transmit tracking information to the central server. If the computer is not connected to the Internet or other network at the time the file is accessed, the software creates a tracking information entry into itself that records the event for future transmission at such time as the computer establishes access to the Internet or network. Such tracking information may include, but is certainly not limited to, the creator of the file or information, personal identity information about the user accessing the file, the date and/or time the file or information was accessed, the source of the file or information, the destination of the file or information, the modifications (if any) made to the file or information, any actions performed on the file or information (such as copying, deleting, renaming, etc.), the IP address of the computer accessing the file or information, the hard drive serial number, BIOS information including serial number(s), the geographical coordinates of the computer (such as GPS coordinates when the hardware component is present) accessing the file or information, and the like.

In an exemplary embodiment, configuration of this electronic file or tracking software can only be performed by an authorized individual with the right computer, using a encryption key from the central server. In this embodiment a method for tracking electronic information is provided which includes the steps of encrypting an electronic file; attaching or incorporating the contents of the subject information or data as a standalone executable program; upon accessing the file, implementing a request for an encryption key accompanied with tracking information; verifying the tracking information; providing an encryption key if the tracking information is verified; and modifying the file to include a record of the failed verification attempt and the tracking information if the tracking information is not verified.

A GUI is provided for the selection of items to be so tagged within or between networks, workstations, LANS, WANS, MANS or any other topography required. The location of the repository for the tracking and or alarming events can be anywhere.

User definable levels of security (such as encryption) and sensitivity of the information so protected are definable. For example, at a very low level of security the file could be opened by anyone and simply the act of opening the file would constitute the tracked access event. This level of event notification would log and/or report the identifying information of the file access, but the file would otherwise be accessible by anyone.

At a higher level of security, for example, the file would be fully 128-bit blowfish encrypted with random seed generated keys structure with traditional password access enhanced or replaced with biometric or other unique authentication means serving both as random seed and access-usage identifiers, thus uniquely encoding and encrypting the file contents and providing a single use, one way decoding key. For this higher level of security, the software might track the file, its usage, the creator or author of the file, its source of origin and the destination, the user requesting the file time date and/or other evidentiary identifiers as required, and might also require the single use key to be delivered from the backend tracking servers to be read or used by the recipient. Additional security can be added by requiring the counter-signing of the transmission of the key to decode from the operator console of the tracking server or other means.

The invention utilizes TCP, IP, IPSX, UDP, HTTP or any other transport protocol as an available vehicle for file/data transmission. With such a file/data transmission scheme, it is not necessary for the end-user computers to have the necessary decryption software or codes, as such decryption software or codes resides on the server. Thus, the invention is designed with the ability to extensibly incorporate new and/or alternate the encryption techniques and technologies into the architecture and is also designed with the ability to extensibly incorporate new and/or alternate data transmission standards or formats into the architecture (EDI, PKI, XML and HXML data transmission platforms are available with this architecture, for example).

The invention includes the option of installing and maintaining virtual encrypted hard drive structures on the servers and clients that contain all the logs, keys, the software etc. as appropiate. The invention so embodied provides deniability of any data, information, documents, or other electronic information stored in such a manner.

Preferably, there is no footprint of the software component of the invention in operating system (such as Windows) registry entries and there is no secondary file storage of keys, passwords etc. All information is stored in the "virtual hard drive," if you will, and can appear as any other appropriate file type. In addition, the software component of the invention so stored within other file structures does not prevent the "host" file from operating normally. The software component of the invention when examined at a bit level contains seemingly random 1's and 0's further adding to security and plausible deniability. The software component of the invention can be totally integrated into a file type (such as a .wav sound/music files) as appropriate in such a manner that the file will in all aspects function as a normal file (i.e., the .wav file will play the music through the computer speakers using standard media players (real audio, Msmedia, etc.)).

As an example implementation, if a trackable file is stolen from a computer, once the stolen file is attempted to be opened upon another computer, the trackable file will communicate with the central server the first time that the user of the stolen file logs on to the Internet or connects to any network with the ability to route information to the central server(s). This user of the stolen file could be tracked using the Internet address of the user's computer, hard drive serial number, computer BIOS identifiers, embedded computer serial numbers and the like; or, if the user's computer has one of the hardware components of another embodiment of the present invention, the user's computer can be tracked using the GPS coordinates obtained from the hardware component and transmitted to the central server.

The invention may also be used to help computer and software retailers, for example, locate computers and software files worldwide. Such an invention can be useful to track computers and computer components and can prevent/monitor the pirating of software, for example. The invention may also be used to track sensitive corporate or government files, documents and other electronic information storage systems. Additionally, the invention may be used to comply with the standards of the HIPPA (Health Insurance Portability and Accountability Act of 1996) by permitting complete medical records to be transmitted over a secure network with robust record tracking capabilities, authorzed and unauthorized access, information usage and modification data.

Embodiments of the invention also make it feasible to broadcast from a central server to a "tagged" electronic file, document, computer, or other information storage system which will return a locational information file to the central server Having described the invention in detail and by reference to the specific embodiments thereof as provided in the accompanying Appendix, it will be apparent that numerous modifications and variations are possible without departing from the spirit and scope of the invention defined by the following claim:

What is claimed is:

1. A method for tracking electronic information comprising:
    encrypting an electronic file stored on a hardware storage device;
    attaching or incorporating with the file a standalone executable program that implements a request for a decryption key accompanied by tracking information when an attempt is made to access the file;
    verifying the tracking information by a central processing unit;
    if the tracking information is verified as acceptable, providing the decryption key; and
    if the tracking information is not verified as acceptable, modifying the file to include a record of the failed attempt to access the file and the tracking information, and storing said modified file on the hardware storage device.

2. The method of claim 1, wherein the tracking information contains the geographic location of the hardware storage device.

3. The method of claim 2, wherein the geographic location of the hardware storage device is obtained through the use of a global positioning system.

4. The method of claim 1, wherein the tracking information contains personal identity information of a user attempting to access the file.

5. The method of claim 1, wherein the tracking information contains an indication of any modifications made to the file.

6. A hardware storage device comprising:
    an electronic data file stored thereon; and
    a standalone executable program stored thereon that implements a request for a decryption key accompanied by tracking information when an attempt is made to access the electronic data file;
    the hardware storage device being operationally linked to a computer system configured to perform the steps of:
    encrypting the electronic data file stored on the hardware storage device;
    executing the standalone executable program by a central processing unit to request a decryption key accompanied by tracking information when an attempt is made to access the electronic data file;
    verifying the tracking information by the central processing unit;
    if the tracking information is verified as acceptable, providing the decryption key; and
    if the tracking information is not verified as acceptable, modifying the file to include a record of the failed attempt to access the file and the tracking information, and storing said modified file on the hardware storage device.

7. The hardware storage device of claim 6, wherein the tracking information contains the geographic location of the hardware storage device.

8. The hardware storage device of claim 7, wherein the geographic location of the hardware storage device is obtained through the use of a global positioning system.

9. The hardware storage device of claim 6, wherein the tracking information contains personal identity information of a user attempting to access the file.

10. The hardware storage device of claim 6, wherein the tracking information contains an indications of any modifications made to the file.

* * * * *